United States Patent
Toumpelis

(10) Patent No.: US 11,122,055 B2
(45) Date of Patent: Sep. 14, 2021

(54) DYNAMIC CONTROL OF PLAYLISTS

(71) Applicant: SPOTIFY AB, Stockholm (SE)

(72) Inventor: Nikolaos Toumpelis, Stockholm (SE)

(73) Assignee: Spotify AB, Stockholm (SE)

(*) Notice: Subject to any disclaimer, the term of this patent is extended or adjusted under 35 U.S.C. 154(b) by 186 days.

(21) Appl. No.: 16/248,594

(22) Filed: Jan. 15, 2019

(65) Prior Publication Data

US 2019/0149555 A1 May 16, 2019

Related U.S. Application Data

(63) Continuation of application No. 15/183,599, filed on Jun. 15, 2016, now Pat. No. 10,212,171.

(60) Provisional application No. 62/238,635, filed on Oct. 7, 2015.

(51) Int. Cl.
| | |
|---|---|
| *G06F 16/438* | (2019.01) |
| *H04L 29/06* | (2006.01) |
| *H04L 29/08* | (2006.01) |
| *H04W 12/08* | (2021.01) |
| *H04W 4/80* | (2018.01) |
| *H04W 4/02* | (2018.01) |

(52) U.S. Cl.
CPC ........ *H04L 63/107* (2013.01); *G06F 16/4387* (2019.01); *H04L 63/0492* (2013.01); *H04L 67/18* (2013.01); *H04W 4/80* (2018.02); *H04W 12/08* (2013.01); *H04W 4/023* (2013.01)

(58) Field of Classification Search
CPC ............. G06F 17/30053; G06F 3/0482; G06F 3/04817; G06F 17/30772; G06F 3/0486; G06F 16/4387; H04L 63/107; H04L 63/0492; H04L 67/18; H04W 4/80; H04W 12/08; H04W 4/023
See application file for complete search history.

(56) References Cited

U.S. PATENT DOCUMENTS

| | | |
|---|---|---|
| 7,682,028 B2 | 3/2010 | Maeda et al. |
| 7,873,988 B1 | 1/2011 | Issa et al. |
| 8,027,634 B1 | 9/2011 | Warner et al. |

(Continued)

FOREIGN PATENT DOCUMENTS

| | | |
|---|---|---|
| EP | 1564621 A1 | 8/2005 |
| EP | 2677757 A2 | 12/2013 |

OTHER PUBLICATIONS

Ahlin, Notice of Allowance, U.S. Appl. No. 14/668,732, dated Jun. 9, 2015, 12 pgs.

(Continued)

*Primary Examiner* — Truong V Vo
(74) *Attorney, Agent, or Firm* — Morgan, Lewis & Bockius LLP

(57) ABSTRACT

A server performs a method of controlling the manipulation of a playlist that includes a queue of media items to be played. The method includes authorizing a first electronic device to control the manipulation of the playlist and generating the playlist based on a set of media preferences associated with the first electronic device. The method further includes, after authorizing a second electronic device to manipulate the playlist, receiving, from the second electronic device, a request to update an order of media items in the playlist and generating an updated order of media items in the playlist in response to receiving the request from the second electronic device.

13 Claims, 15 Drawing Sheets

(56) References Cited

U.S. PATENT DOCUMENTS

| | | | |
|---|---|---|---|
| 8,145,532 | B2 | 3/2012 | Jones et al. |
| 8,296,675 | B2 | 10/2012 | Falchuk |
| 8,838,730 | B2 | 6/2014 | Ishii |
| 9,195,383 | B2 | 11/2015 | Garmark et al. |
| 9,432,431 | B2 | 8/2016 | O'Malley |
| 9,483,230 | B1 | 11/2016 | Bates et al. |
| 9,602,999 | B2 | 3/2017 | Kim et al. |
| 2004/0103312 | A1 | 5/2004 | Messerges et al. |
| 2004/0225746 | A1* | 11/2004 | Niell ................ H04L 67/04 709/231 |
| 2004/0235521 | A1 | 11/2004 | Pradhan et al. |
| 2005/0036509 | A1 | 2/2005 | Acharya et al. |
| 2006/0173974 | A1 | 8/2006 | Tang |
| 2006/0258289 | A1 | 11/2006 | Dua |
| 2007/0049256 | A1 | 3/2007 | Wassingbo |
| 2007/0085846 | A1 | 4/2007 | Yang et al. |
| 2008/0051025 | A1 | 2/2008 | Casati et al. |
| 2008/0212944 | A1 | 9/2008 | Khedouri et al. |
| 2008/0313264 | A1 | 12/2008 | Pestoni |
| 2008/0320543 | A1 | 12/2008 | Wang et al. |
| 2009/0217036 | A1 | 8/2009 | Irwin et al. |
| 2012/0158531 | A1 | 6/2012 | Dion et al. |
| 2012/0290653 | A1 | 11/2012 | Sharkey |
| 2012/0311444 | A1 | 12/2012 | Chaudhri |
| 2013/0139271 | A1 | 5/2013 | Arrelid et al. |
| 2013/0225081 | A1 | 8/2013 | Doss et al. |
| 2013/0231044 | A1 | 9/2013 | Wang |
| 2013/0262469 | A1 | 10/2013 | Whitman |
| 2013/0268593 | A1 | 10/2013 | Parekh |
| 2013/0346859 | A1 | 12/2013 | Bates et al. |
| 2014/0029921 | A1 | 1/2014 | Warren et al. |
| 2014/0059644 | A1 | 2/2014 | Shin et al. |
| 2014/0096219 | A1 | 4/2014 | Lang |
| 2014/0119407 | A1 | 5/2014 | Miller |
| 2014/0136601 | A1 | 5/2014 | Kent |
| 2014/0279817 | A1 | 9/2014 | Whitman et al. |
| 2014/0365491 | A1 | 12/2014 | Macaulay |
| 2015/0135284 | A1 | 5/2015 | Bogard |
| 2015/0150110 | A1 | 5/2015 | Canning et al. |
| 2016/0088044 | A1 | 3/2016 | Wolf |
| 2016/0100303 | A1 | 4/2016 | Kim et al. |
| 2016/0143079 | A1 | 5/2016 | Yoon et al. |
| 2016/0174036 | A1 | 6/2016 | Ruhstaller |
| 2016/0246792 | A1* | 8/2016 | Anguiano ........... G06F 16/9537 |
| 2016/0294974 | A1 | 10/2016 | Luna et al. |
| 2017/0185052 | A1 | 6/2017 | Wang |

OTHER PUBLICATIONS

Ahlin, Office Action, U.S. Appl. No. 14/817,083, dated Oct. 15, 2015, 16 pgs.
Ahlin, Final Office Action, U.S. Appl. No. 14/817,083, dated Mar. 18, 2016, 16 pgs.
Ahlin, Notice of Allowance, U.S. Appl. No. 14/817,083, dated Jul. 18, 2016, 8 pgs.
Ahlin, Notice of Allowance, U.S. Appl. No. 14/883,413, dated Feb. 2, 2016, 8 pgs.
Ahlin, Office Action, U.S. Appl. No. 15/250,614, dated Sep. 11, 2017, 13 pgs.
Ahlin, Office Action, U.S. Appl. No. 15/938,745, dated Oct. 18, 2018, 20 pgs.
Lennon, Office Action, U.S. Appl. No. 15/354,920, dated Mar. 17, 2017, 7 pgs.
Lennon, Final Office Action, U.S. Appl. No. 15/354,920, dated Jul. 19, 2017, 12 pgs.
Lennon, Office Action, U.S. Appl. No. 15/282,375, dated Apr. 21, 2017, 7 pgs.
Lennon, Final Office Action, U.S. Appl. No. 15/282,375, dated Sep. 27, 2017, 8 pgs.
Spotify AB, Extended European Search Report, EP15183490.0, dated Nov. 2, 2015, 9 pgs.
Spotify AB, Communication Pursuant to Article 94(3), EP15183490.0, dated Jul. 31, 2017, 6 pgs.
Spotify AB, International Search Report, PCTIB2015002605, dated Apr. 19, 2016, 4 pgs.
Spotify AB, International Preliminary Report on Patentability, PCTIB2015002605, dated Jul. 4, 2017, 9 pgs.
Toumpelis, Office Action, U.S. Appl. No. 15/183,599, dated Apr. 12, 2018, 10 pgs.
Toumpelis, Notice of Allowance dated Oct. 4, 2018, U.S. Appl. No. 15/183,599, 7 pgs.
Toumpelis, Office Action, U.S. Appl. No. 15/183,685, dated Aug. 14, 2018, 14 pgs.
Toumpelis, Final Office Action, U.S. Appl. No. 15/183,685, dated Mar. 14, 2019, 16 pgs.
Toumpelis, Office Action, U.S. Appl. No. 15/183,685, dated Oct. 4, 2019, 15 pgs.
U.S. Appl. No. 10/219,100, filed Feb. 26, 2019, Luna.
Spotify AB, Extended European Search Report, EP19172512.6, dated Jul. 11, 2019, 10 pgs.
Stojmenovic, Ivan et al., "9 Bluetooth scatternet formation in ad hod wireles networks," In: Performance Modeling and Analysis of Bluetooth Networks, Dec. 12, 2005, Auerbach Publications XP0555599290, ISBN: 978-0-8493-3157-2, 28 pgs.
Toumpelis, Final Office Action, U.S. Appl. No. 15/183,685, dated Feb. 24, 2020, 16 pgs.
Toumpelis, Office Action, U.S. Appl. No. 15/183,685, dated Oct. 30, 2020, 18 pgs.

\* cited by examiner

US 11,122,055 B2

DYNAMIC CONTROL OF PLAYLISTS

RELATED APPLICATIONS

This application is a continuation of U.S. application Ser. No. 15/183,599, entitled "Dynamic Control of Playlists," filed Jun. 15, 2016, which claims benefit of U.S. Provisional Application No. 62/238,635, filed Oct. 7, 2015, both of which are incorporated by reference in their entirety.

TECHNICAL FIELD

The present disclosure generally relates to the provision of media, and more particularly to the streaming of media. Embodiments described herein relate to methods, servers and electronic devices for dynamically controlling a playlist including a queue of playable media items (e.g., songs).

BACKGROUND

As computer technology has improved, the digital media industry has evolved greatly in recent years. Users are able to use electronic devices such as mobile communication devices (e.g., cellular telephones, mobile telephones, smart phones, tablet computers (also known as tablets), etc.) to consume media content such as music, video, etc. For instance, users can listen to audio content (e.g., music) and/or watch video content (e.g., movies, television (TV) broadcasts, etc.) on a variety of electronic devices.

At the same time, advances in network technology have increased the speed and reliability with which information can be transmitted over computer networks. It is therefore possible for users to stream media content over computer networks as needed, or on demand, rather than receiving a complete file in physical media (such as a CD or a DVD, or downloading the entire file) before consuming the media content.

At social gatherings, users often wish to share media content with friends, relatives, and new acquaintances. For example, a party host may access media content on a portable electronic device, such as a mobile phone or a tablet computer, and present media content through a media presentation system (e.g., play music on one or several speakers or stream video on a screen).

SUMMARY

It is in view of the above considerations and others that the various embodiments disclosed herein have been made.

It is a general object of the embodiments described herein to allow for an improved way of controlling playback of media, such as music, e.g. at social gatherings.

In a first of its aspects, this disclosure concerns a method of controlling the manipulation of a playlist. The playlist may include a queue of media items (e.g., songs) to be played. The method is typically, but not necessarily, performed by a server having one or more processors and a memory. The memory stores instructions for execution by the one or more processors. A first electronic device may be authorized to control the manipulation of the playlist. First geographic information that indicates a geographic location of the first electronic device is accessed, or otherwise determined. Second geographic information that indicates a geographic location of a second electronic device is also accessed, or otherwise determined. It is determined, based on the first geographic information and the second geographic information, whether the first and second electronic devices are located within a defined geographic proximity. In other words, it may be determined whether the first and second electronic devices are proximate to one another. In response to a determination that the first and second electronic devices are located within the defined geographic proximity (i.e., the first and second electronic devices are proximate to one another), the second electronic device is also authorized to manipulate the playlist, e.g. the order of the media items in the playlist.

Furthermore, an updated order of media items in the playlist may be generated in response to receiving a request from either the first electronic device or the second electronic device to manipulate the playlist. For example, an updated order of media items in the playlist may be generated in response to receiving a request from the second electronic device to manipulate the playlist. The order of media items in the playlist may be updated repeatedly based on requests from both the first and second electronic devices.

Prior to accessing the first geographic information that indicates the geographic location of the first electronic device, the playlist may be generated based on a set of media preferences associated with the first electronic device.

In one embodiment, third geographic information that indicates a geographic location of a third electronic device is also accessed, or otherwise determined. In response to a determination that a third electronic device has entered the defined geographic proximity with the first electronic device and the second electronic device (i.e., the third electronic device is proximate to the first electronic device and/or the second electronic device), the third electronic device is also authorized to manipulate the playlist.

Thus, an updated order of media items in the playlist may also be generated in response to receiving a request from the first electronic device, the second electronic or the third electronic device to manipulate the playlist. The order of media items in the playlist may be updated repeatedly based on requests from the first, second, and/or third electronic devices. Again, prior to accessing first geographic information that indicates the geographic location of the first electronic device, the playlist may for example be generated based on a set of media preferences associated with the first electronic device.

In a second of its aspects, this disclosure concerns a server for controlling the manipulation of a playlist. The playlist may include a queue of media items to be played. The server typically, but not necessarily, comprises one or more processors and a memory. The memory comprises (i.e., stores) instructions executable by the processor(s) whereby the server is operative to authorize a first electronic device to control the manipulation of the playlist; access first geographic information that indicates a geographic location of the first electronic device; access second geographic information that indicates a geographic location of a second electronic device; determine, based on the first geographic information and the second geographic information, whether the first and second electronic devices are located within a defined geographic proximity; and in response to a determination that the first and second electronic devices are located within the defined geographic proximity, also authorize the second electronic device to manipulate the playlist, such as the order of the media items in the playlist.

The memory may further comprise instructions executable by the processor(s) whereby the server is operative to generate an updated order of media items in the playlist in response to receiving a request from either the first electronic device or the second electronic device to manipulate the playlist. The server may repeatedly update the order of the media items based on requests from both the first and second electronic devices.

Furthermore, the memory may comprise instructions executable by the processor(s) whereby the server is operative to generate the playlist based on a set of media preferences associated with the first electronic device prior to accessing first geographic information that indicates the geographic location of the first electronic device.

In one embodiment, the memory also comprises instructions executable by the processor(s) whereby the server is operative to access third geographic information that indicates a geographic location of a third electronic device; and in response to a determination that a third electronic device has entered the defined geographic proximity with the first electronic device and the second electronic device, also authorize the third electronic device to manipulate the playlist.

The memory may also comprise instructions executable by the processor(s) whereby the server is operative to generate an updated order of media items in the playlist in response to receiving a request from the first electronic device, the second electronic device or the third electronic device to manipulate the playlist. The server may repeatedly update the order of the media items based on requests from the first, second, and/or third electronic devices.

Moreover, the memory may comprise instructions executable by the processor(s) whereby the server is operative to generate the playlist based on a set of media preferences associated with the first electronic device prior to accessing first geographic information that indicates the geographic location of the first electronic device.

In a third of its aspects, this disclosure concerns a computer program, comprising instructions which, when executed on at least one processor, cause the at least one processor to carry out the method according to the earlier-mentioned first aspect. A carrier may also be provided. The carrier comprises the computer program according to the third aspect. Furthermore, the carrier may be one of an electronic signal, an optical signal, a radio signal, or a computer readable storage medium. For example, a computer readable storage medium may be a non-transitory computer readable storage medium storing one or more programs, the one or more programs comprising instructions, which, when executed by a server system having one or several servers with one or more processors, cause the server system to perform the method of: authorizing a first electronic device to control the manipulation of a playlist; accessing first geographic information that indicates a geographic location of the first electronic device; accessing second geographic information that indicates a geographic location of a second electronic device; determining, based on the first geographic information and the second geographic information, whether the first and second electronic devices are located within a defined geographic proximity; and in response to a determination that the first and second electronic devices are located within the defined geographic proximity, also authorizing the second electronic device to manipulate the playlist.

Various embodiments described herein may allow a user of a second electronic device to control a queue of playable media items (e.g., songs) in a playlist, which is associated with a different, i.e. a first, electronic device. The authorization to control the queue of playable media items associated with the first electronic device is determined based on the proximity between the second electronic device and the first electronic device. Embodiments described herein therefore enable users of electronic devices to control each other's playlists when the users (and their respective electronic devices) are proximate to one another. In an example scenario at a social gathering, e.g. a party, several users (and their respective electronic devices) may be proximate to each other and all users (and their respective electronic devices) that are located within a defined geographic proximity to the first electronic device may be authorized to control the playlist associated with the first electronic device. In this way, several users may be invited to collaboratively control a queue of playable media items to be played at the social gathering. This, in turn, may lead to improved user experiences at social gatherings.

In a fourth of its aspects, this disclosure concerns a method of operating a second electronic device for manipulation of a playlist. The playlist may include a queue of media items to be played. A request to explore whether a first electronic device is located within a defined geographic proximity from the second electronic device is received. In response to a determination that a first electronic device is located within a defined geographic proximity from the second electronic device, relative distance information indicating the relative distance between the second electronic device and the first electronic device is accessed. In response thereto, the method additionally comprises operating on the accessed relative distance information to generate a visual map at a user interface of the second electronic device, wherein the second electronic device and the first electronic devices are plotted as icons within the visual map. Thus, the relative distance between the second electronic device and the first electronic device can be presented on the visual map. Furthermore, in response to receiving a request to access a playlist associated with a plotted icon representing the first electronic device, the playlist associated with the first electronic device is accessed, e.g. by presenting the playlist at the user interface of the second electronic device.

In one embodiment, the receiving of the request to explore whether the first electronic device is located within the defined geographic proximity from the second electronic device includes detecting a first control gesture at the user interface of the second electronic device. The first control gesture may for example be tap gesture, a swipe gesture, or a hovering gesture.

Furthermore, receiving the request to access the playlist associated with the plotted icon representing the first electronic device may include detecting a second control gesture at the user interface of the second electronic device. The second control gesture may for example be tap gesture, a swipe gesture, or a hovering gesture at the plotted icon representing the first electronic device.

In one embodiment, the method may additionally comprise receiving a request to manipulate an order of media items of the presented playlist in accordance with a user preference; and in response thereto transmitting a request to a server requesting the server to manipulate the order of media items in the playlist in accordance with this user preference.

In some embodiments the method may additionally, or alternatively, comprise transmitting second geographic information that indicates a geographic location of the second electronic device to a server; and in response to a determination by the server that the first electronic device is located within a defined geographic proximity from the second electronic device, receiving relative distance information indicating the relative distance between the second electronic device and the first electronic device from the server.

In a fifth of its aspects, this disclosure concerns a second electronic device that can manipulate a playlist. The playlist may include a queue of media items to be played. The second electronic device comprises a user interface, a processor and a memory. The memory comprises (i.e., stores) instructions executable by the processor whereby the second electronic device is operative to receive a request to explore (e.g., determine) whether a first electronic device is located within a defined geographic proximity from the second electronic device; in response to a determination that the first electronic device is located within a defined geographic proximity from the second electronic device, access relative distance information indicating the relative distance between the second electronic device and the first electronic device; and in response thereto operate on the accessed relative distance information to generate a visual map at a user interface of the second electronic device, wherein the second electronic device and the first electronic devices are plotted as icons within the visual map to present the relative distance between the second electronic device and the first electronic device on the visual map; and in response to receiving a request to access a playlist associated with a plotted icon representing the first electronic device, access the playlist associated with the first electronic device by presenting the playlist at the user interface.

In some embodiments, the memory comprises instructions executable by the processor whereby the second electronic device is operative to receive the request to explore whether the first electronic device is located in a defined geographic proximity from the second electronic device by detecting a first control gesture at the user interface. For example, the first control gesture may be a tap gesture, a swipe gesture, or a hovering gesture.

In some embodiments, the memory comprises instructions executable by the processor whereby the second electronic device is operative to receive the request to access the playlist associated with the plotted icon representing first electronic device by detecting a second control gesture at the user interface. For example, the second control gesture may be tap gesture, a swipe gesture, or a hovering gesture at the plotted icon representing first electronic device.

In some embodiments, the second electronic device further comprises a transmitter and the memory comprises instructions executable by the processor whereby the second electronic device is operative to: receive a request to manipulate an order of media items of the presented playlist in accordance with a user preference; and in response thereto transmit, by the transmitter, a request to a server requesting the server to manipulate the order of media items in the playlist in accordance with the user preference.

In some embodiments, the second electronic device additionally, or alternatively, comprises a transmitter and a receiver (or, alternatively, a transceiver) and the memory comprises instructions executable by the processor whereby the second electronic device is operative to: transmit, by means of the transmitter to a server, second geographic information that indicates a geographic location of the second electronic device; and receive, by means of the receiver from the server, relative distance information indicating the relative distance between the second electronic device and the first electronic device in response to a determination by the server that the first electronic device is located in a defined geographic proximity from the second electronic device.

In a sixth of its aspects, this disclosure concerns a computer program, comprising instructions which, when executed on at least one processor, cause the at least one processor to carry out the method according to the earlier-mentioned first aspect. A carrier may also be provided. The carrier comprises the computer program according to the third aspect. Furthermore, the carrier may be one of an electronic signal, an optical signal, a radio signal, or a computer readable storage medium. For example, a computer readable storage medium may be a non-transitory computer readable storage medium storing one or more programs, the one or more programs comprising instructions, which, when executed by a second electronic device with one or more processors, cause the second electronic device to perform the method of: receiving a request to explore whether a first electronic device is located within a defined geographic proximity from the second electronic device; in response to a determination that a first electronic device is located within a defined geographic proximity from the second electronic device, accessing relative distance information indicating the relative distance between the second electronic device and the first electronic device; and in response thereto operating on the accessed relative distance information to generate a visual map at a user interface of the second electronic device, wherein the second electronic device and the first electronic devices are plotted as icons within the visual map to present the relative distance between the second electronic device and the first electronic device on the visual map; in response to receiving a request to access a playlist associated with a plotted icon representing the first electronic device, accessing the playlist associated with the first electronic device by presenting the playlist at the user interface.

Various embodiments described herein thus enable a user of a second electronic device to remotely control a queue of playable media items (e.g., songs) of a playlist, which is associated with a different, i.e. a first, electronic device. The authorization to control the playlist associated with the first electronic device is determined based on the proximity between the second electronic device and the first electronic device. Embodiments described hereinabove thus enable a user of the second electronic device to control another user's playlist when these users (and their respective electronic devices) are proximate to one another. This, in turn, may lead to improved user experiences, e.g. at social gatherings such as parties.

BRIEF DESCRIPTION OF DRAWINGS

These and other aspects, features and advantages will be apparent and elucidated from the following description of various embodiments, reference being made to the accompanying drawings, in which.

DETAILED DESCRIPTION

Figure 1:
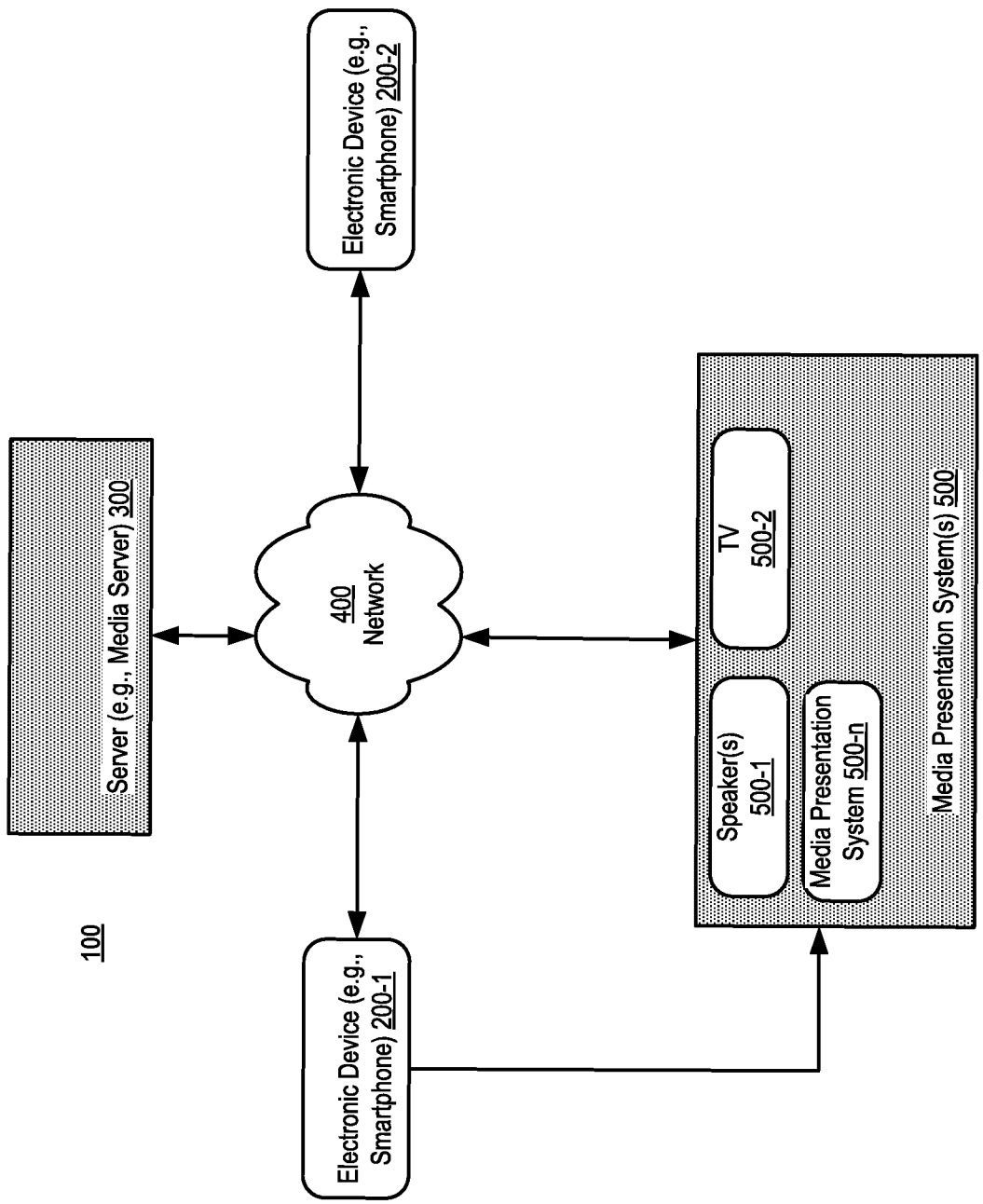
FIG. 1 is a block diagram schematically illustrating an exemplary media content delivery system in accordance with some embodiments.

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout this description and the drawings.

As described earlier, some existing solutions for playback of streamed media content may be inadequate. It is therefore a general object of the embodiments described herein to allow for an improved playback of streamed media content.

To address this, in accordance with some embodiments, described herein are a method and server for controlling the manipulation of a playlist. A first electronic device is authorized to control the manipulation of a playlist. This playlist may comprise a queue of media items to be played and may, for example, be based on a set of media preferences associated with the first electronic device. First geographic information that indicates a geographic location of the first electronic device is accessed, or otherwise determined. Second geographic information that indicates a geographic location of a second electronic device is also accessed, or otherwise determined. It is also determined, based on the first geographic information and the second geographic information, whether the first and second electronic devices are located within a defined geographic proximity. In response to a determination that the first and second electronic devices are located within the defined geographic proximity, the second electronic device is also authorized to manipulate the playlist.

This way, it is made possible to enable a user of the second electronic device to control a queue of playable media items (e.g., songs) of the playlist, which is associated with a different, i.e. the first, electronic device. In other words, both the user of the first electronic device and the user of the second electronic device may manipulate the order of playable media items of the playlist that is associated with the first electronic device (or the user subscription account associated with user of the first electronic device). The authorization to control the playlist associated with the first electronic device is determined based on the proximity between the second electronic device and the first electronic device. This has the effect that users of electronic devices can remotely control each other's playlists of media items when the users (and their respective electronic devices) are proximate to one another. In an example scenario at a social gathering, e.g. a party, several users (and their respective electronic devices) may be proximate to each other and all users (and their respective electronic devices) that are located within a defined geographic proximity to the first electronic device may be authorized to control the playlist associated with the first electronic device. In this way, several users may control (e.g. collaboratively control) the queue of playable media items to be played at the social gathering. This, in turn, may lead to improved user experiences at social gatherings.

FIG. 1 schematically illustrates a media content delivery system 100 in accordance with some embodiments. The media content delivery 100 may comprise one or several electronic devices 200 (e.g., first electronic device 200-1 and second electronic device 200-2), one or more servers 300 (e.g., computer server(s) such as media content server(s) (sometimes referred to as media server(s))), and one or more media presentation systems (e.g., media presentation systems 500 including speaker(s) 500-1, television (TV) 500-2, and/or other media presentation systems 500-n).

In some embodiments, the electronic device 200 may be a mobile telephone, such as a smart phone. Alternatively, the electronic device 200 may be a tablet computer. In yet other embodiments, the electronic device 200 may be any other electronic device capable of playback of media content such as, for example, one of the electronic devices of the following group: a personal computer, a laptop, and a mobile electronic device (e.g. a handheld entertainment device, a digital media player, or other media device).

One or several networks (e.g., network(s) 400) may communicatively connect each component of the media content delivery system 100 with other components of the media content delivery system 100. The network(s) 400 may include public communications networks, private communication networks or a combination of both public and private communication networks. For example, the networks(s) may include any network(s) such as the Internet, other wide area networks (WAN), wireless wide area networks (WWAN), local area networks (LAN), wireless local area networks (WLAN), virtual private networks (VPN), metropolitan area networks (MAN), peer-to-peer networks, and/or ad-hoc networks. As will also be appreciated, the network(s) 400 may thus comprise cellular telecommunications network(s) and/or non-cellular network(s).

In some embodiments, as is illustrated in FIG. 1, the electronic device 200 (e.g., the first electronic device 200-1 in the following example) is capable of remotely controlling one or more of the media presentation systems 500. To this end, the first electronic device 200-1 may for example implement, or otherwise utilize, any of the techniques described in the international patent application PCT/IB2013/001938 (published under WO2014/001913A2). For example, it is possible for a user of the first electronic device 200-1 to remotely control the presentation of media at any one or a combination of the media presentation systems 500. WO2014/001913A2 is incorporated herein by reference in its entirety. The first electronic device 200-1 may receive a media control command for a media presentation system 500 (e.g. speaker(s) 500-1). In response to receiving this media control command, the first electronic device 200-1 may send a server media control request to the server 300 and a local media control request to the media presentation system 500, which may located be within the same local network, e.g. a LAN, as the first electronic device 200-1 (i.e., a local network to which both the first electronic device 200-1 and the media presentation system 500 are connected). The server media control request may for example be sent to the server 300 over the Internet. Typically, but not necessarily, the server 300 is associated with an Internet Protocol (IP) address outside the space of the local network to which both the first electronic device 200-1 and the media presentation system 500 are connected. As will be appreciated, the first electronic device 200-1 and the media presentation system 500 may thus be associated with IP addresses within the same sub network. The first electronic device 200-1 may hence provide a user interface that allows a user 600 to select media content for presentation by the electronic device 200-1 itself and, also, to generate media control request(s) to cause the media content to be presented, or played, by the media presentation system 500. Furthermore, the server media request and the local media request are both configured to cause a media control operation, performed at the first electronic device 200-1, to be implemented at the media presentation system 500.

In an example scenario related to a social gathering, a host (i.e., a user) may thus interact with his or her first electronic device 200-1 to remotely control the playback of media content at the media presentation system 500, e.g. the playback of streamed music through loudspeakers(s) 500-1. This way, it is for example possible for a party host (i.e., the user) to control the playback of music that is to be played at the social gathering, e.g. a party.

While the above example has been described with respect to the first electronic device 200-1, it should be appreciated that the second electronic device 200-2 may have the same features and, thus, employ the same functionality as the first electronic device 200-1. For example, the second electronic device 200-2 may also implement, or otherwise utilize, any of the techniques described in WO2014/001913A2.

Figure 2:
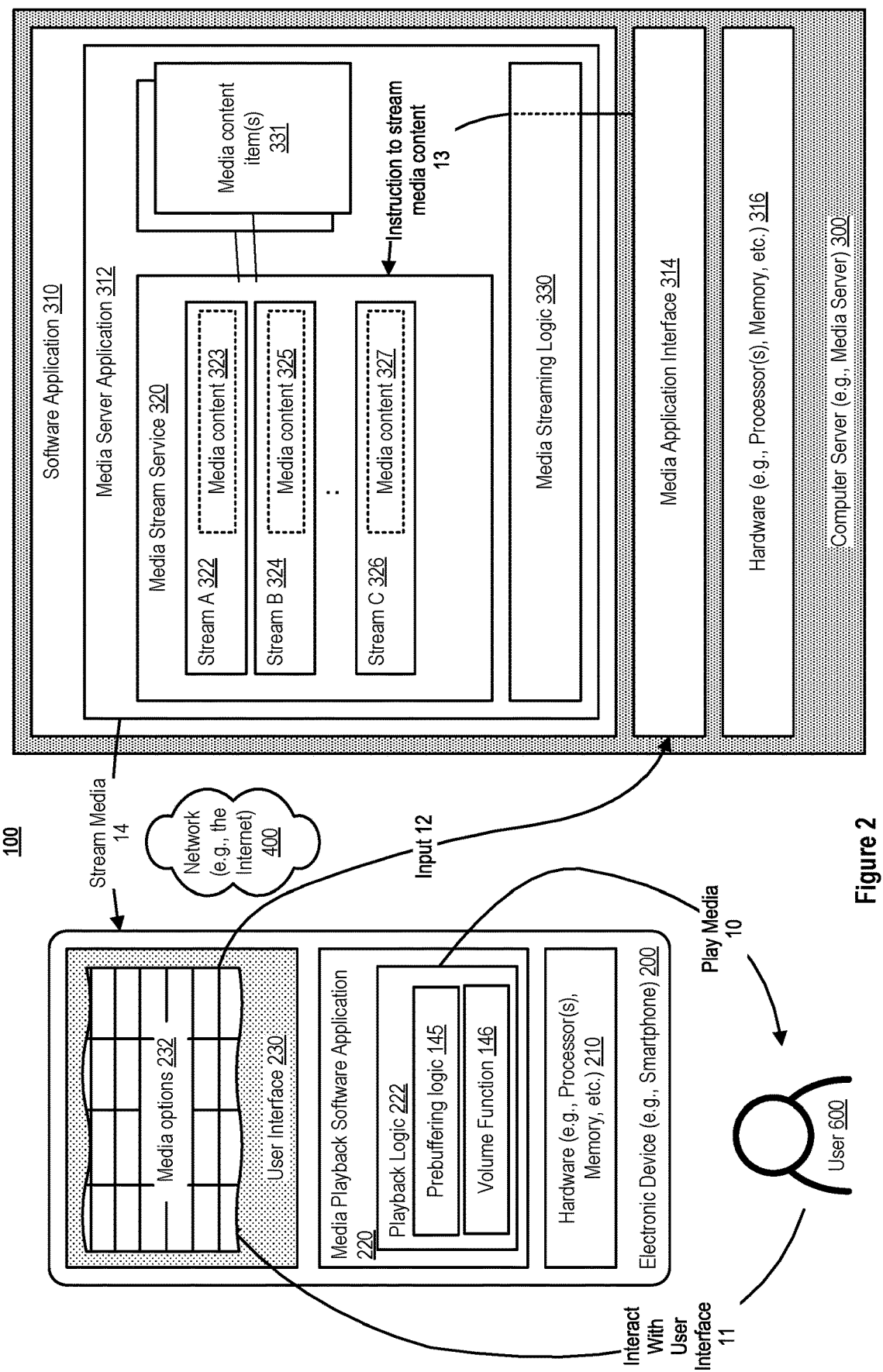
FIG. 2 illustrates an example embodiment of a system for playback of a media content stream and/or dynamic control of a queue of playable media items, in accordance with some embodiments.

Turning now to FIG. 2, an example environment where embodiments of this disclosure may be applied will be described. An electronic device 200 (e.g. the first electronic device 200-1 or the second electronic device 200-2 of FIG. 1) may be communicatively connectable to the server 300 via the network 400, e.g. the Internet, as described hereinabove. As can be seen in FIG. 2, only a single electronic device 200 and a single server 300 are shown. However, the server 300 may support the simultaneous use of multiple electronic devices 200-1, 200-2, etc., and/or the electronic device 200 can simultaneously access media content at multiple servers 300. Although FIG. 2 illustrates the server 300 in accordance with some embodiments, FIG. 2 is intended more as a functional description of the various features, or components, which may be present in one or more servers, rather than a structural schematic of the various implementations described throughout this disclosure. In practice, and as recognized by persons skilled in the art, components shown separately could be combined and some components could be separated.

In the following description and in order not to obscure the detailed description with unnecessary detail, the media content will in general be exemplified to be audio content, e.g. in form of music. This should, however, not be interpreted as limiting the scope of the various embodiments of the disclosed embodiments.

As is schematically shown in FIG. 2, the electronic device 200 (e.g., the first electronic device 200-1 or the second electronic device 200-2 shown in FIG. 1) may be used for the playback of media content (e.g., audio content such as music), which is provided by the server 300. The electronic device 200 may include one or several physical computer resources, or hardware resources 210. The hardware resources 210 may e.g. include one or several processors (or, processing circuitry), a communications interface (or, communication circuitry) and one or several memories. Likewise, the server 300 operating as a media server may include one or several physical computer resources, or hardware resources 316. The hardware resources 316 may likewise include e.g. include one or several processors (or, processing circuitry), a communications interface (or, communication circuitry) and one or several memories.

The server 300 may include an operating system or other processing system which supports execution of a software application 310, including a media server application 312 which may be used, for example, to stream media content such as audio content (e.g., music). A media stream service 320 may be used to buffer media content, for streaming to one or more media streams 322, 324, and 326. A media application interface 314 may receive requests from electronic devices 200 or other systems, to retrieve media content 331 from the server 300.

Media content 331, or media items, may be provided, for example, within a first storage such as a memory (e.g., including a database), or may be received by the server 300 from another source (not shown). The other source (not shown) could be external to the server 300, i.e. it may be located remotely from the server 300.

A media streaming logic 330 may be used to retrieve or otherwise access the media content 331 in response to requests from electronic devices 200 or other systems, and populate the media stream service with streams 322, 324, 326 of corresponding media content data 323, 325, 327 that may be returned, i.e. streamed, to the requesting electronic device 200.

The electronic device 200 comprises a user interface 230. The user interface 230 may, among other things, be adapted to display or otherwise provide a visual array of media options 232 and to determine user input. The visual array of media options 232 may for example be provided as a two-dimensional grid, a list, or other visual array format. Each media option in the visual array of media options 232 may correspond to a respective media stream 322, 324, 326.

Selecting a particular media option within the visual array 232 may be used, or otherwise interpreted, as a request or instruction to the media server application 312 to stream or otherwise return a corresponding particular media content item. For example, in accordance with some embodiments, the software application 310 at the server 300 may be used to stream or otherwise communicate media content to the electronic device 200, wherein the user interface 230 at the electronic device 200 is adapted to display a plurality of media options that correspond to respective media streams.

In accordance with some embodiments, the electronic device 200 may also include a media playback application 220, together with a playback logic 222, pre-buffering logic 145, and a volume function 146, which may be used to control the playback of media content that is received from the media server application 312, for playback by the electronic device 200, as described in further detail below.

A user 600 may interact 11 with the user interface 230 of the electronic device 200 and issue requests, for example the playing of a selected media option at the electronic device 200. The user's selection of a particular media option may be communicated 12 to the media server application 312, via the media application interface 314. The media server application 312 may then be instructed 13 to stream corresponding media content 13, including one or more streams of media content data 323, 325, 327, and subsequently stream 14 or otherwise communicate the selected media, to the user's electronic device 200. In accordance with some embodiments, pre-buffering requests from the electronic device 200 may also be communicated 12 to the media server application 312 via the media application interface 314. At the electronic device 200, in response to the user's interaction with the user interface 230, the media playback application 220, including the playback logic 222, may play 10 the requested media content to the user 600.

Figure 3:
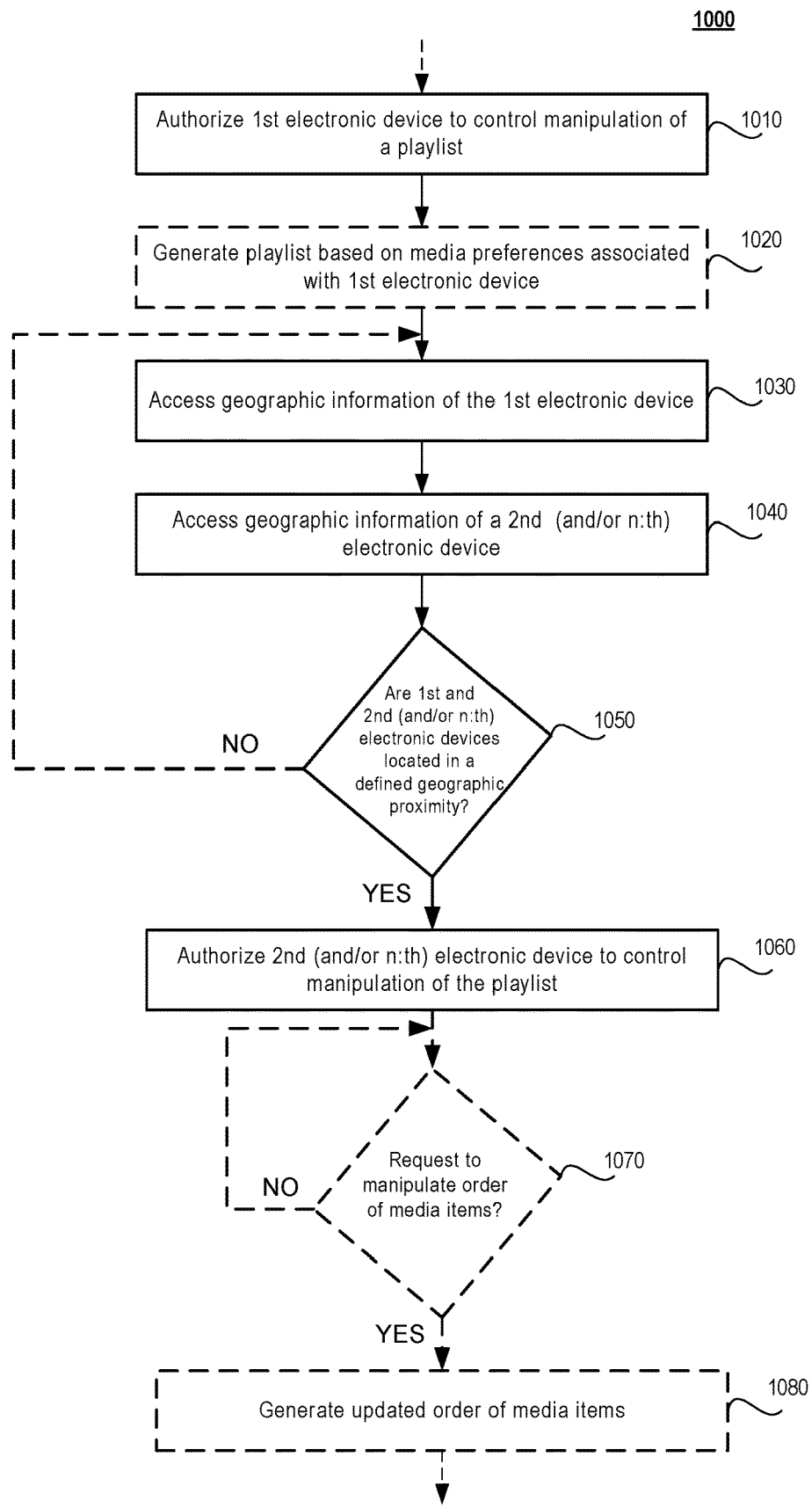
FIG. 3 schematically illustrates a flowchart of a method in accordance with some embodiments.

Reference is now made to FIG. 3, which schematically illustrates a flowchart of a method 1000 for controlling the manipulation of a playlist in accordance with some embodiments. The playlist may for example include a queue of media items to be played. The method 1000 may be performed by, or otherwise executed in, a server 300. In one embodiment, the server 300 is implemented by one single server. In an alternative embodiment, the server 300 may be implemented by two or more servers, i.e. the method may be performed by several servers in a distributed manner.

A first electronic device 200-1 may be authorized 1010 to control the manipulation of a playlist, or one or more playlists. The authorization 1010 may comprise the server 300 receiving a request from the first electronic device 200-1 for accessing the playlist(s) corresponding to a user account that is associated with the user of the first electronic device 200-1. Upon receiving this request from the first electronic device 200-1, the server 300 may check the credentials of the first electronic device 200-1 to check whether the first electronic device 200-1 is allowed to access playlist(s) corresponding to the requested user account. If, or when, the server determines that the first electronic device 200-1 is allowed to access the playlist(s) corresponding to the requested user account, the server 300 may authorize, or otherwise approve, the request. Accordingly, the server 300 may authorize 1010 the first electronic device 200-1 access to playlist(s) corresponding to the user account that is associated with the user of the first electronic device 200-1.

The playlist(s) corresponding to the user account that is associated with the user of the first electronic device 200-1 may be generated 1020 based on media preferences associated with the first electronic device 200-1 (or, more precisely, the user associated with the first electronic device 200-1). The media preferences associated with the first electronic device 200-1 may thus include, for example, user preferences to a collection of media items, e.g. songs. As will be appreciated, the playlist(s) can be generated by the server 300 automatically. For example, the server 300 may apply a set of user preferences to a collection of media items to identify selections in the collection that satisfy the set of user preferences. User-selected preferences may define media items that are to be included in or excluded from the playlist(s), particular genres or styles, and so on. They can also define a media item to be used as a seed to find similar media items. To create a different playlist, a user of the first electronic device 200-1 may modify the media preferences and submit the modified media preferences to the server 300.

With continued reference to FIG. 3, first geographic information that indicates a geographic location of the first electronic device 200-1 may be accessed 1030. Also, second geographic information that indicates a geographic location of a second electronic device 200-2 may be accessed 1040. Based on the accessed first geographic information and the accessed second geographic information, it can be determined 1050, or otherwise concluded, whether the first and second electronic devices 200-1, 200-2 are located within a defined geographic proximity, i.e. whether the first electronic device 200-1 and the second electronic device 200-2 are proximate to one another. Furthermore, in response to a determination 1050 that the first and second electronic devices 200-1, 200-2 are located within the defined geographic proximity (1050-YES), the second electronic device 200-2 is also authorized 1060 to manipulate the playlist. In other words, second electronic device 200-2 can be authorized 1060 to manipulate the playlist corresponding to the user account associated with the first electronic device 200-1.

In some embodiments, n:th geographic information that indicates a geographic location of a n:th electronic device 200-2 may also be accessed 1040, where n is an integer greater than 2. In other words, the server 300 may access geographic information related to a plurality of electronic devices. Based on the accessed first geographic information, the accessed second geographic information as well as the accessed n:th geographic information, it can be determined 1050 whether the first, the second and the n:th electronic devices (i.e., the plurality of electronic devices) are located within a defined geographic proximity, i.e. whether the first electronic device 200-1, the second electronic device 200-2 and/or the n:th electronic devices are proximate to one another. Furthermore, in response to a determination 1050 that the multiple electronic devices are located within the defined geographic proximity, those multiple electronic devices that are determined to be within defined geographic proximity may also be authorized 1060 to manipulate the playlist. In other words, those multiple electronic devices that are determined to be within defined geographic proximity can be authorized 1060 to manipulate the playlist corresponding to the user account associated with the first electronic device 200-1.

As will be appreciated, the second electronic device 200-2 and/or the n:th electronic device (e.g., some or all of the plurality of electronic devices) may subsequently transmit, i.e. send, request(s) to the server 300 to manipulate the playlist(s) corresponding to the user account associated with the first electronic device 200-1. For example, the request(s) may include a request to manipulate the order of media items of the playlist(s), i.e. the order in which the media items should be played.

In response to receiving 1070 a request from the first electronic device 200-1, the second electronic device 200-2, or the n:th electronic device to manipulate the playlist, an updated order of the media items in the playlist can be generated 1080, or otherwise created. The order of the media items may be updated repeatedly in this manner in response to successive requests.

It should be appreciated that the server 300 may access the first, second and/or n:th geographic information in various ways. In order to reduce the embodiments described herein into practice, it is not necessary that this geographic information is accurate, or exact. Rather, a coarse estimation of the location may be sufficient in some embodiments. What is of comparatively more importance is the relative distance between the first electronic device 200-1 and its surrounding electronic devices. In other words, in order to reduce the embodiments described herein into practice it suffices to determine whether (or not) a second (and/or n:th) electronic device 200-2 is (/are) proximate to the first electronic device 200-1.

Furthermore, it will be appreciated that there exist various ways of determining whether the second electronic device 200-2 (or n:th electronic device) is (/are) proximate to the first electronic device 200-1. A few non-limiting examples will be discussed in the following.

In some implementations, each of the first and second electronic devices 200-1, 200-2 determines its respective geographic location (e.g., using a Global Navigation Satellite System (GNSS), such as the Global Positioning System (GPS)). Each of the first and second electronic devices 200-1, 200-2 may transmit a message to the server 300 to inform the server 300 about the determined geographic location (e.g., in the form of GPS coordinates). The server 300 may hence access first geographic information that indicates a geographic location of the first electronic device 200-1 by receiving a message from the first electronic device 200-1, wherein the message includes the determined geographic location of the first electronic device 200-1. Likewise, the server 300 may access second geographic information that indicates a geographic location of the second electronic device 200-2 by receiving a message from the second electronic device 200-2, wherein the message includes the determined geographic location of the second electronic device 200-2. Based on the accessed first geographic information and the accessed second geographic information (e.g., in the form of determined GPS coordinates), it may then be determined by the server 300 whether the first and second electronic devices are located within a defined geographic proximity.

In other implementations, the first electronic device 200-1 and the second electronic device 200-2 may communicate with one another (e.g., using Bluetooth, Near Field Communication (NFC), or other technologies) to determine whether they are within a predefined distance of one another, i.e. whether they are proximate to each other. Once it is determined, by either device, that they are within the predefined distance of one another, the second electronic device 200-2 may be adapted to transmit a message to the server 300 indicating that the second electronic device 200-2 is proximate to the first electronic device 200-1. The server 300 may thus be informed by the second electronic device 200-2 that the first and second electronic devices 200-1 and 200-2 are located in proximity to one another (i.e. the electronic devices 200-1, 200-2 are within a defined geographic proximity). Consequently, the server 300 may also determine, or otherwise conclude, that the first and second electronic devices 200-1, 200-2 are located within the defined geographic proximity. In view of this, it should be appreciated that it is not necessary that the electronic device 200-2 transmits a message to the server 300 that indicates geographic positions of both electronic devices 200-1, 200-2. Instead, it should be appreciated that, when used herein, the expression "accessing first geographic information that indicates a geographic location of the first electronic device and accessing second geographic information that indicates a geographic location of a second electronic device" may equivalently mean:

i) accessing (e.g., receiving from the second electronic device 200-2) information indicating a relative distance between the first and the second electronic devices 200-1, 200-2; or, alternatively, ii) accessing (e.g., receiving from the second electronic device 200-2) information indicative of the first and second electronic devices 200-1, 200-2 being proximate to one another.

Those implementations where the first electronic device 200-1 and the second electronic device 200-2 communicate with one another (e.g., using Bluetooth or similar technology) to determine whether they are within a predefined distance may be advantageous, because they allow for less expensive implementations compared to the earlier-mentioned implementations that use GNSS (e.g., GPS) positioning. Also, a proximity detection where the first electronic device 200-1 and the second electronic device 200-2 communicate with one another (e.g., using Bluetooth) to determine whether they are within a predefined distance of one another typically does not require a Wi-Fi connection or similar connection. As a consequence, this may allow for user-friendly implementations which are intuitive and easy-to-use for the user of the electronic devices 200-1, 200-2.

Turning now to FIGS. 4A-I in conjunction with FIG. 5, an example scenario where embodiments may be applied at a social gathering, e.g. a party, will be described in further detail. FIGS. 4A-I schematically illustrates an example user interface 230 of a second electronic device 200-2, e.g. in the form of a mobile phone. FIG. 5 schematically illustrates a flowchart of a method 2000 which is performed by, or executed in, the electronic device 200-2 in accordance with some embodiments. The second electronic device 200-2 typically comprises a user interface 230. The user interface 230 typically includes output device(s) and input device(s), as is known and conventional in the art. In advantageous implementations, the user interface 230 includes a display that includes a touch-sensitive surface, in which case the display is a touch-sensitive display. The touch-sensitive display is adapted to detect or otherwise determine a user input. In electronic devices 200 that have a touch-sensitive display, a soft keyboard may for example be displayed when keyboard entry is needed. As is recognized by persons skilled in the art, a soft keyboard is a keyboard that may replace the physical keyboard on electronic devices 200 having touch-sensitive displays. Hence, in electronic devices 200 that have a touch-sensitive display a physical keyboard is only optional.

Figure 4A:
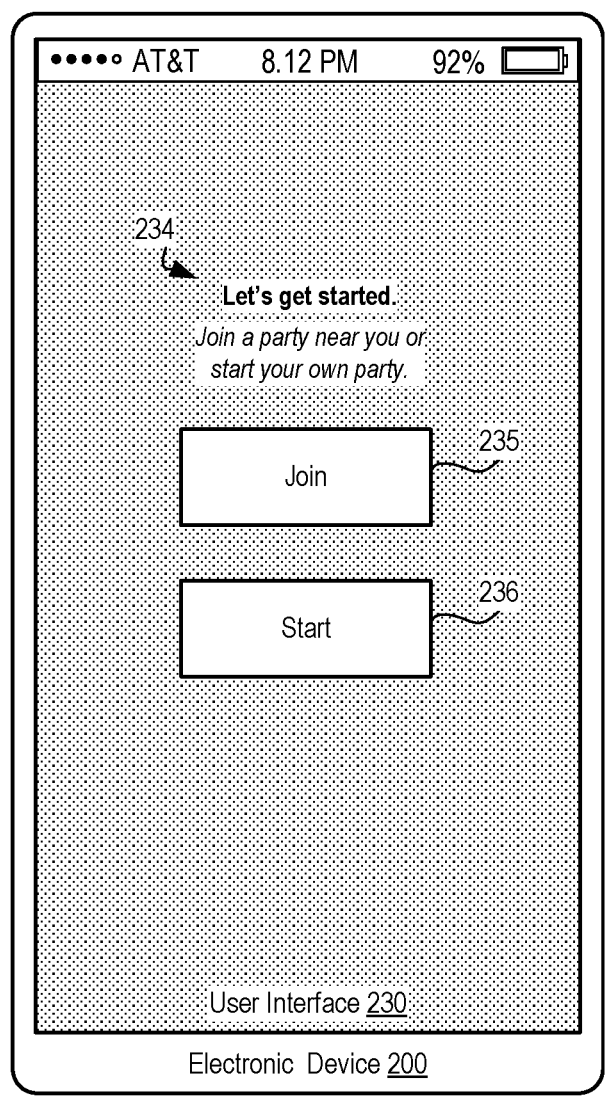
FIGS. 4A-I schematically illustrate different views of an example embodiment of a user interface of an electronic device, here exemplified by a mobile telephone such as a smartphone.
Figure 5:
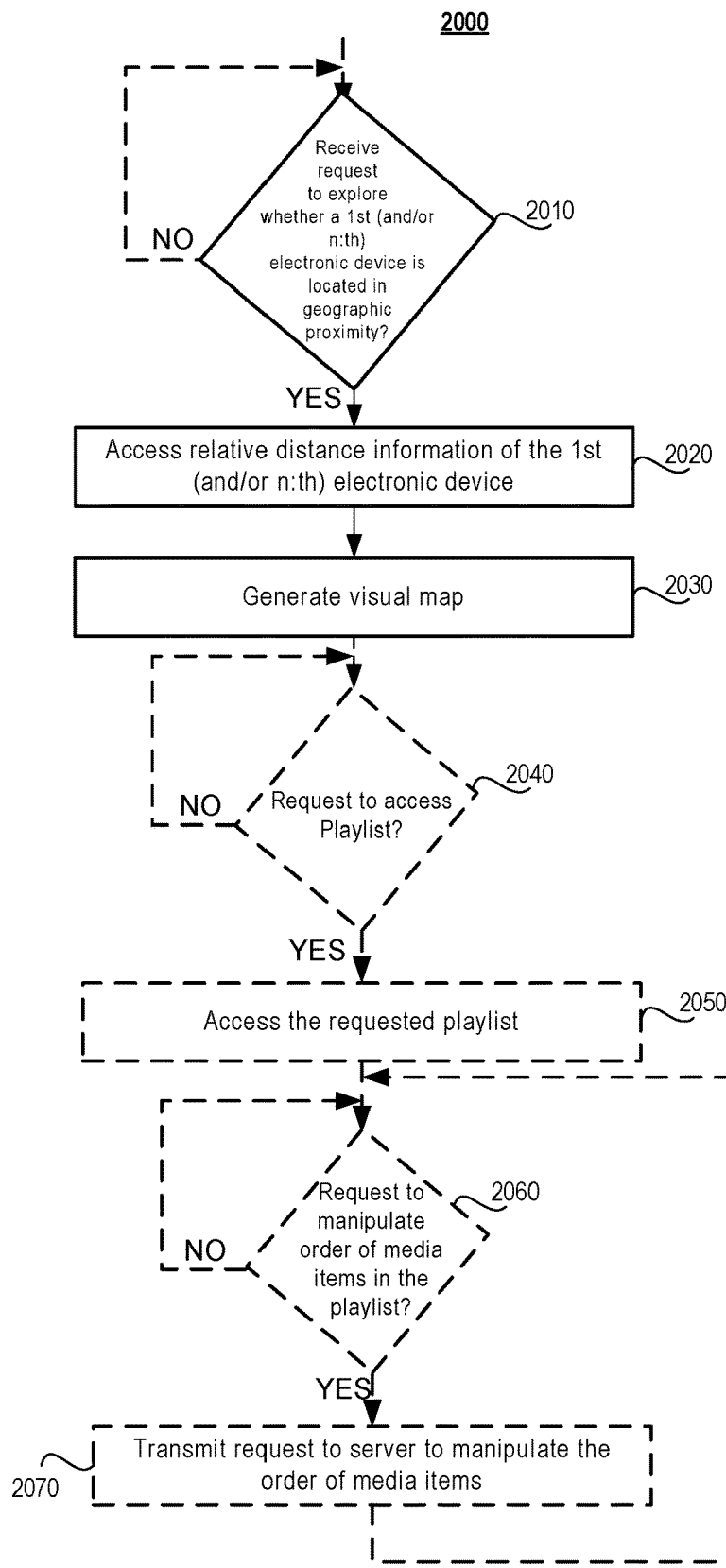
FIG. 5 schematically illustrates a flowchart of a method in accordance with some embodiments.

As can be seen in FIG. 4A, a user 600 may optionally be presented by textual information 234 that presents selectable user preference options to the user of the second electronic device 200-2. The user may for example be presented by icons 235 (e.g., "Join") and 236 (e.g., Start) (or other affordances) corresponding to the selectable user preference options. In this example, the textual information 234 is "Let's get started. Join a party near you or start your own party." As can be seen in FIG. 4A, the user may thus be presented with two different selectable options, either to join a party or to start a new party.

Figure 4B:
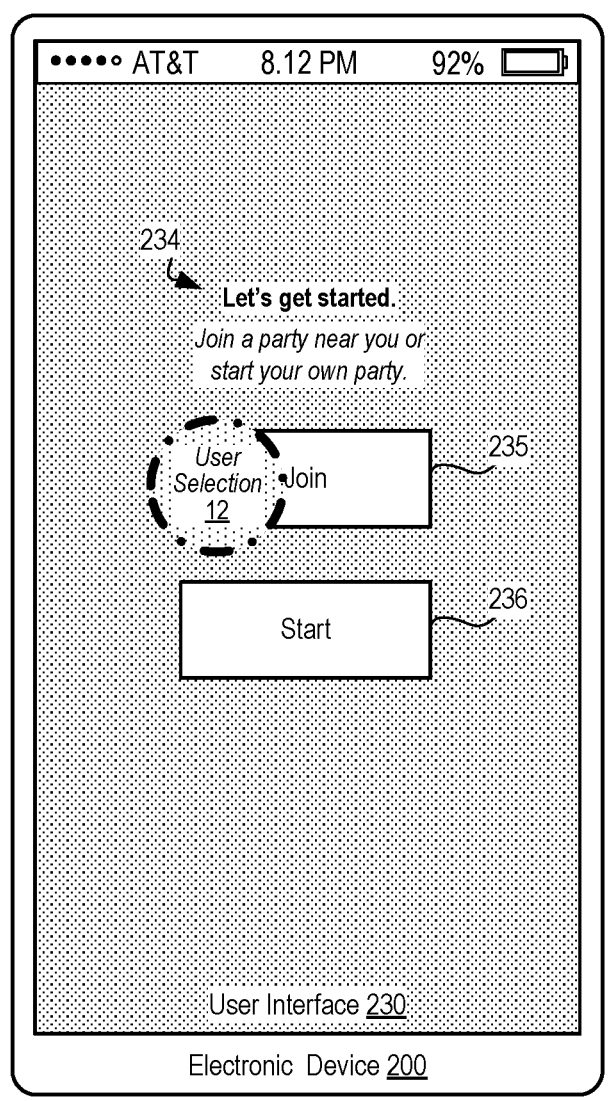

Turning now to FIG. 4B, a user 600 may perform an initial control gesture. The initial control gesture may for example be a hovering gesture (e.g., by the user's finger or by means of a stylus) over the display area of the display of the user interface 230 to approach, and eventually reach, the display area of the desired selectable user preference option (in this example icon 235, i.e. "Join"). Upon a first control gesture, e.g. a tap gesture, within the display area corresponding to the selected user preference option (i.e., icon 235 in this example), this may be interpreted by the electronic device 200-2 to be a request, or instruction, to explore whether a first electronic device 200-1 (see e.g. FIG. 1) is located within a defined geographic proximity from the second electronic device 200-2, i.e. whether there exists a first electronic device 200-1 in proximity to the second electronic device 200-2. In other words, the second electronic device 200-2 may receive 2010 a request, or instruction, to explore whether a first electronic device 200-1 is located within a defined geographic proximity of the second electronic device 200-2. This may also be interpreted by the electronic device 200-2 to be a request, or instruction, to the second electronic device 200-2 that the user 600 of the second electronic device 200-2 wishes to explore whether there exist any neighboring parties that the user 600 may join. In response to a determination that a first electronic device 200-1 (or, alternatively, multiple electronic devices) is (/are) located within a defined geographic proximity from the second electronic device 200-2, relative distance information indicating the relative distance between the second electronic device 200-1 and the first electronic device 200-2 (and/or other electronic devices) may be accessed 2020.

In some implementations, the second electronic device 200-2 and any neighboring electronic device may communicate with one another (e.g., using Bluetooth or other technology) to determine whether they are within a predefined distance of one another, i.e. whether they proximate to one another. Hence, the second electronic device 200-2 may access 2020 relative distance information indicating the relative distance between the second electronic device 200-2 and a first electronic device 200-1. In other implementations, the second electronic device 200-2 may determine its geographic location (e.g., using a GNSS, such as GPS) and transmit a message including geographic information that indicates the geographic location of the second electronic device 200-2. Upon the server 300 receiving geographic information from the second electronic device 200-2, and/or the first electronic device 200-1 and/or other electronic devices, the server 300 may determine the relative distance(s) between these electronic devices. Also, the server 300 may return (i.e., transmit) information about the determined relative distance(s) between the second electronic device 200-2 and the first electronic device 200-1 (and optionally also additional electronic devices). As will be recognized by those skilled in the art, the second electronic device 200-2 may thus access 2020 relative distance information indicating the relative distance between the second electronic device 200-1 and the first electronic device 200-1 (and optionally also additional electronic devices). In some implementations, the server 300 may return (i.e., transmit) information about the determined relative distance(s) between the second electronic device 200-2 and the first electronic device 200-1 (and potentially also additional electronic devices) only conditionally, e.g. on the condition that the server 300 has determined that the electronic devices in question are indeed proximate to one another.

Figure 4C:
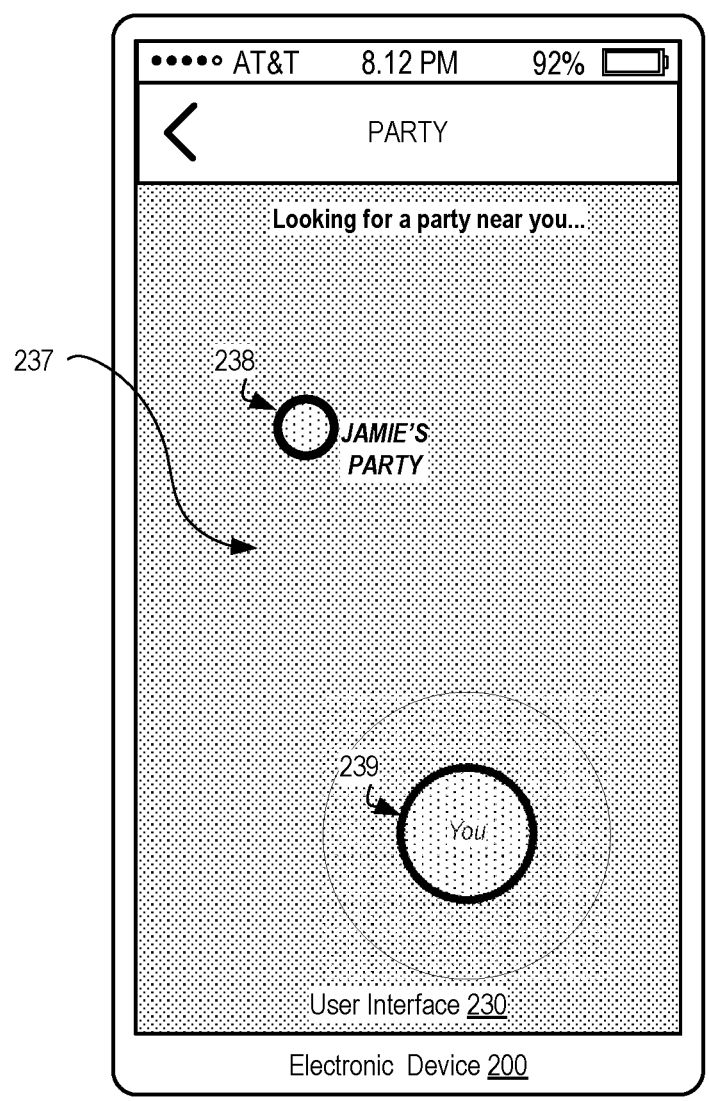

In response to the second electronic device 200-2 accessing 2020 the relative distance information indicating the relative distance between the second electronic device 200-2 and the first electronic device 200-1 (and potentially also other electronic devices), the second electronic device 200-2 may operate on this accessed relative distance information to generate 2030 a visual map 237 at the user interface 230 of the second electronic device 200-2 (e.g., in response to a determination that the electronic devices are proximate). As is schematically illustrated in FIG. 4C, the second electronic device 200-2 and the first electronic devices 200-1 are plotted as icons 239 and 238, respectively, within the visual map 237 to present the relative distance between the second electronic device 200-2 and the first electronic device 200-1 at the visual map 237. In this example, the icon 239 represents the second electronic device 200-2 and the icon 238 represents the first electronic device 200-1.

Figure 4D:
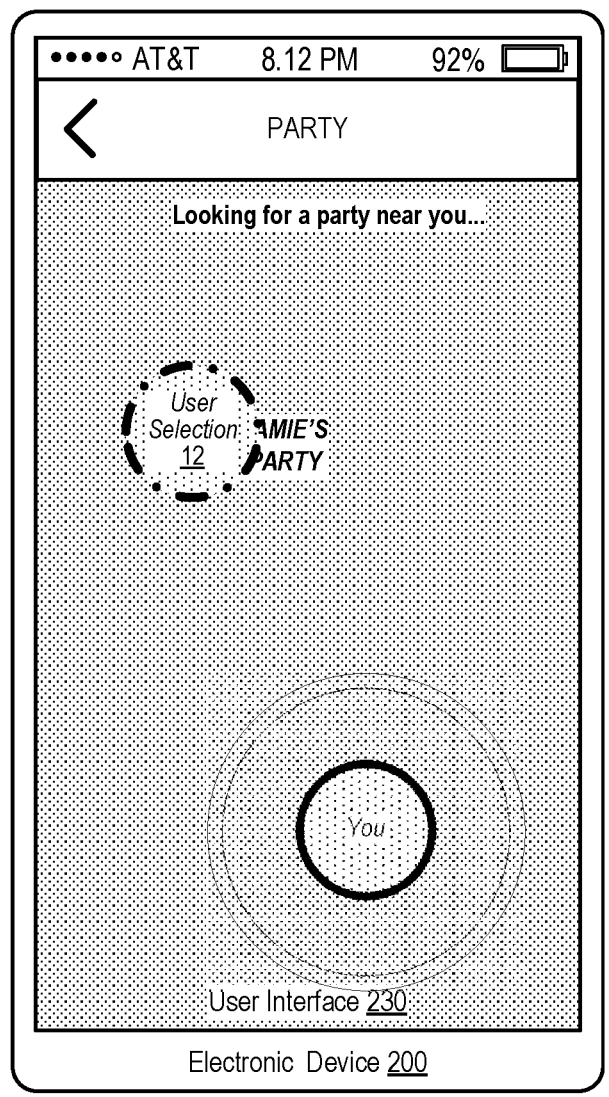

Reference is now made to FIG. 4D. If, or when, the visual map 237 is visualized at the user interface 230 of the electronic device 220-2, the user 600 may perform an initial control gesture. This initial control gesture may for example be a hovering gesture (e.g., by the user's finger or by means of a stylus) over the display area of the display of the user interface 230 to approach, and eventually reach, the display area of the desired selectable user preference option (in this example icon 238, i.e. "Jamie's party"). Upon a second control gesture, e.g. a tap gesture, within or at the display area corresponding to the selected user preference option (i.e., icon 238 in this example), this may be interpreted by the electronic device 200-2 to be a request, or instruction, to access a playlist associated with the plotted icon 238 that represents the first electronic device 200-1 on the visual map 237. In response to receiving 2040 this request to access a playlist associated with the plotted icon 238 representing the first electronic device, the playlist associated with the first electronic device 200-1 may be accessed 2050 by presenting this playlist at the user interface 230 (see FIG. 4E).

Figure 4E:

Reference is now made to FIG. 4E, which schematically illustrates the accessed playlist. It may for example be indicated by textual information, e.g. "Jamie's party", that the accessed playlist is a playlist associated with a different user account, i.e. a user account associated with a different user. The order of the media items in the playlist may be an order in which an upper-most media item of the playlist represents the media item that is currently being played (or, alternatively, that is to be played first) and wherein the subsequent media items represent a queue of media items that are intended be played subsequently, e.g. after the upper-most media items has stopped playing.

Figure 4F:
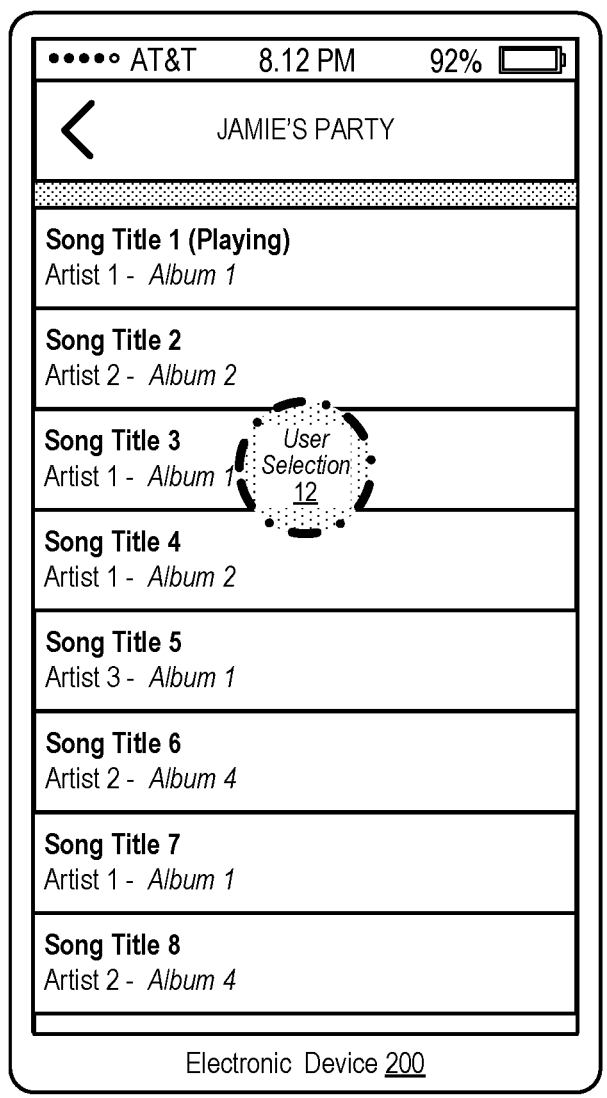
Figure 4G:
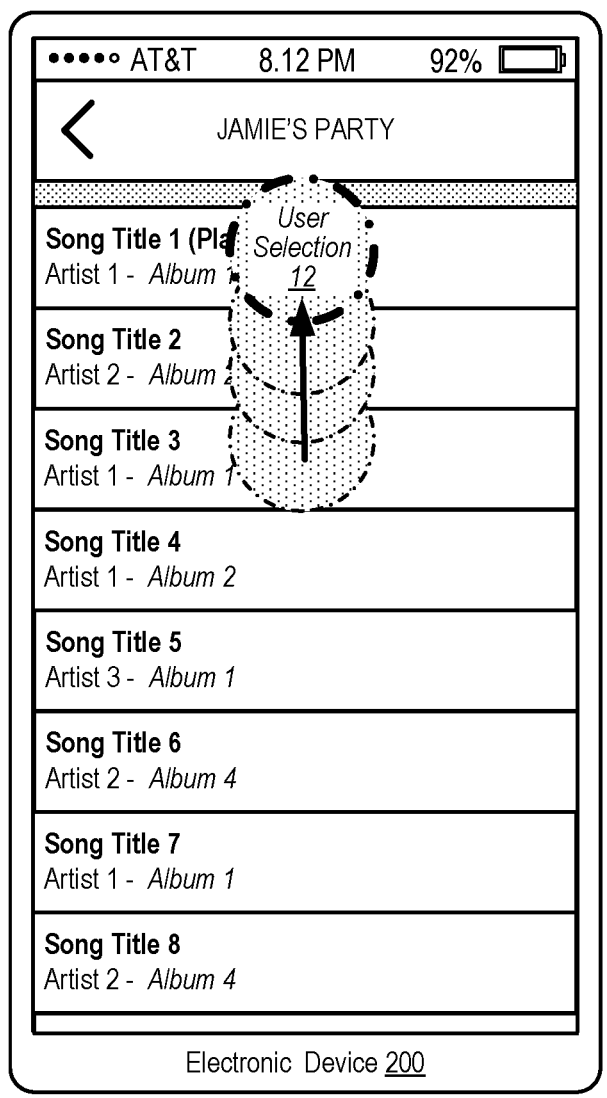
Figure 4H:
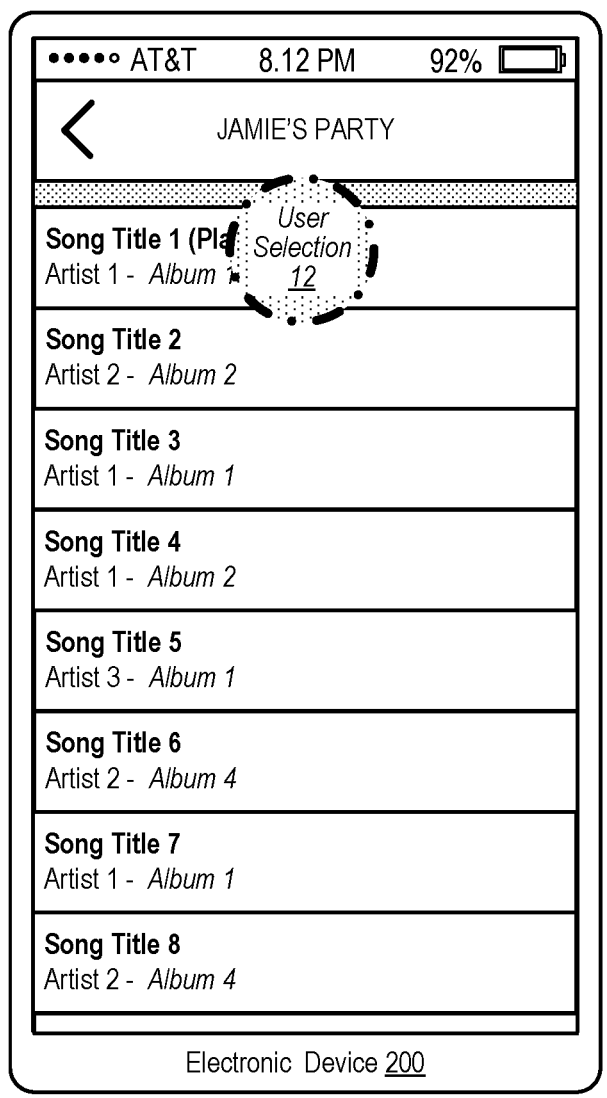
Figure 4I:

Turning to FIG. 4F, a user may perform control gestures within the display area corresponding to the media items of the playlist. In an example scenario, the user may for example begin by performing a tap or tap-and-hold gesture within the display area corresponding to the media item "Song Title 3". This may be interpreted by the second electronic device 200-2 to be a request, or instruction, to select the media item "Song Title 3". Upon selection of the media item, here exemplified by "Song Title 3", the user may continue by performing a swipe-and-hold gesture (e.g., upwards towards the upper-most media item of the playlist), as is illustrated in FIG. 4G. This may be interpreted by the second electronic device 200-2 to be a request, or instruction, to change the priority of the selected media item (i.e., "Song Title 3") in relation to other media items of the playlist. Turning now to FIG. 4H, the user may continue by performing a release-of-hold gesture e.g. at a display area corresponding to the media item that is currently playing (or, alternatively, that is to be played first), i.e. "Song Title 1" in this example scenario. This may be interpreted by the second electronic device 200-2 to be a request, or instruction, to manipulate the order of media items of the presented playlist in accordance with a user preference. In other words, the second electronic device 200-2 may receive 2060 a request to manipulate the order of media items of the presented playlist in accordance with the user's preference. In response to receiving 2060 the request to manipulate the order of media items, a request to this end may be transmitted 2070 to a server 300 requesting the server to manipulate the order of media items in the playlist in accordance with this user preference. In response to a manipulation of the order of media items in the playlist by the server 300, the order of media items of the playlist can also be changed, or otherwise updated, at the second electronic device 200-2, as is schematically illustrated in FIG. 4I.

In some implementations, the order of media items in the playlist may be listed in ascending, or descending, order in dependence of the ranking of the media items of the playlist. For example, in some embodiments the ranking of the media items may be made in dependence of the number of times a certain media item has been previously played. In an example scenario, if or when the user performs a tap gesture within the display area corresponding to the media item "Song Title 3", this may be interpreted by the second electronic device 200-2 to be a request, or instruction, to give the selected media item (i.e., "Song Title 3") a higher ranking, i.e. a request, or instruction, to manipulate the ranking of media items. In a sense, this request may be seen as a request to manipulate the order of media items of the presented playlist in accordance with the user's preference. Accordingly, the second electronic device 200-2 may receive 2060 a request to manipulate the order of media items of the presented playlist in accordance with the user's preference. In response to receiving 2060 this request, a request may be transmitted 2070 to a server requesting the server to give the selected media item a higher ranking and, also, to manipulate the order of media items in the playlist based on the relative rankings of the media items of the playlist. In response to the server having changed, or otherwise updated, the order of media items of the playlist, the new and thus updated order of media items of the playlist may also be changed at the second electronic device 200-2, as is schematically illustrated in FIG. 4I.

As will be appreciated, the various embodiments described hereinabove with respect to FIGS. 4A-I and FIG. 5 may enable a user of a second electronic device 200-2 to remotely control a queue of playable media items (e.g., songs) of a playlist which is associated with a different, i.e. a first, electronic device 200-1 (or, rather, a user account corresponding to a user associated with the first electronic device 200-1). The authorization to control the playlist associated with the first electronic device 200-1 is determined based on the proximity between the second electronic device 200-2 and the first electronic device 200-1. Embodiments described herein thus enable a user of the second electronic device 200-2 to control another user's playlist when these users (and their respective electronic devices) are proximate to one another. This, in turn, may lead to improved user experiences, e.g. at social gatherings such as parties. In some implementations, the second electronic device 200-2 is capable of determining whether (or not) the second electronic device 200-2 is proximate to another electronic device, e.g. the first electronic device 200-1. In alternative implementations, a server is configured to determine whether the second electronic device 200-2 is proximate to other electronic devices, e.g. the first electronic device 200-1.

Figure 6:
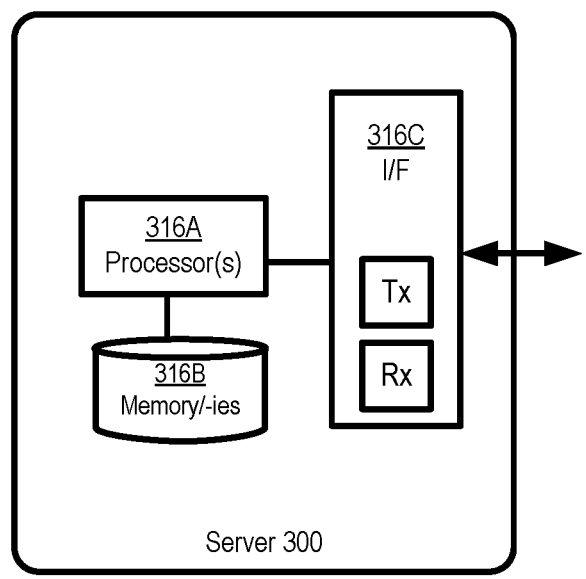
FIG. 6 shows an example implementation of a server in accordance with some embodiments.

Reference is now made to FIG. 6, which schematically illustrates a server 300 (see FIGS. 1 and 2) in accordance with some embodiments. The server 300 is configured to perform, or otherwise execute, the method 1000 in accordance with FIG. 3. To this end, the server 300 comprises hardware resources 316 as described earlier herein. For example, the server 300 may comprise one or more processors 316A and one or more memories 316B. Also, a communications interface 316C, or communications circuitry, may be provided in order to allow the server 300 to communicate with electronic devices 200 and/or other servers 300 and/or media presentation systems 500, e.g. via a network 400 such as the Internet (see FIG. 1). To this end, the communications interface 316C may comprise a transmitter (Tx) and a receiver (Rx). Alternatively, the communications interface 316C may comprise a transceiver (Tx/Rx) combining both transmission and reception capabilities. The communications interface 316C may include a radio frequency (RF) interface allowing the server 300 to communicate with electronic devices 200 and/or other servers 300 and/or media presentation systems 500 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera. As described with reference to FIG. 2, the server 300 may also comprise one or more applications, e.g. the software application 310 including the media server application 312. The applications are sets of instructions (e.g., computer program code), stored in memory 316B, that when executed by the one or more processors 316A control the operation of the server 300 (e.g., cause the method 1000 to be performed).

In some implementations, the one or more memories 316B store computer program code, which, when run in the one or more processors 316A causes the server 300 to authorize a first electronic device to control the manipulation of a playlist. Additionally, the one or more memories 316B store computer program code, which, when run in the one or more processors 316A causes the server 300 to access (e.g. receive via the I/F 316C) first geographic information that indicates a geographic location of the first electronic device 200-1 and to access (e.g., receive via the I/F 316C) second geographic information that indicates a geographic location of a second electronic device 200-2. In some implementations, the one or more memories 316B store computer program code, which, when run in the one or more processors 316A causes the server 300 to determine, on the basis of the first geographic information and the second geographic information, whether the first and second electronic devices 200-1, 200-2 are located within a defined geographic proximity. For example, the one or more processors 316A may operate on the accessed first geographic information and the accessed second geographic information to determine, or otherwise conclude, whether the first and second electronic devices 200-1, 200-2 are proximate to one another. Additionally, the one or more memories 316B may store computer program code, which, when run in the one or more processors 316A causes the server 300 to authorize also the second electronic device to manipulate the playlist in response to a determination that the first and second electronic devices 200-1, 200-2 are located within the defined geographic proximity, i.e. a determination that the first and second electronic devices are proximate to one another.

The one or more memories 316B may also comprise instructions executable by the one or more processors 316A whereby the server 300 is operative to generate an updated order of media items in the playlist in response to receiving (e.g. via the I/F 316C) a request from either the first electronic device 200-1 or the second electronic device 200-2 to manipulate the playlist.

In some implementations, the one or more memories 316B may also comprise instructions executable by the one or more processors 316A whereby the server 300 is operative to generate the playlist based on a set of media preferences associated with the first electronic device 200-1 prior to accessing first geographic information that indicates the geographic location of the first electronic device 200-1.

In some implementations, the one or more memories 316B may also comprise instructions executable by the one or more processors 316A whereby the server 300 is operative to access third geographic information (e.g., receive via I/F 316C) that indicates a geographic location of a third electronic device, and also to authorize the third electronic device to manipulate the playlist in response to a determination that a third electronic device has entered the defined geographic proximity with the first electronic device and the second electronic device.

In some implementations, the one or more memories 316B may also comprise instructions executable by the one or more processors 316A whereby the server 300 is operative to generate an updated order of media items in the playlist in response to receiving a request from the first electronic device 200-1, the second electronic device 200-2 or the third electronic device to manipulate the playlist.

In some implementations, the one or more memories 316B may also comprise instructions executable by the one or more processors 316A whereby the server 300 is operative to generate the playlist based on a set of media preferences associated with the first electronic device 200-1 prior to accessing first geographic information that indicates the geographic location of the first electronic device 200-1.

Figure 7:
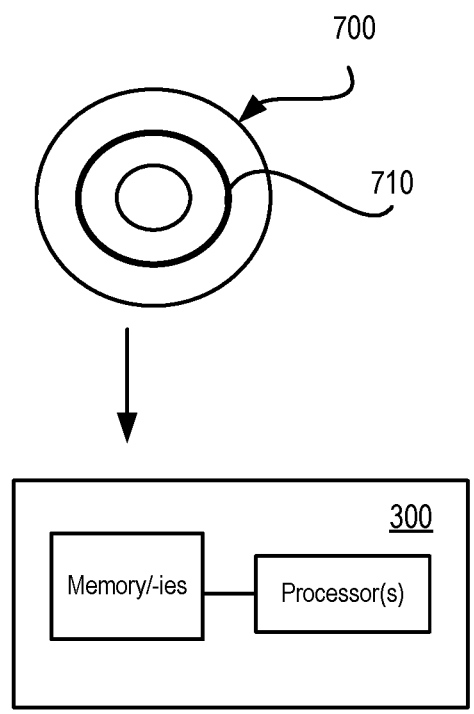
FIG. 7 illustrates a carrier comprising a computer program, in accordance with some embodiments.

FIG. 7 shows an example of a non-transitory computer-readable medium, in this example in the form of a data disc 700. In some embodiments the data disc 700 is a magnetic data storage disc. The data disc 700 is configured to carry instructions 710 that can be loaded into a memory 316B of an apparatus, e.g. server 300. Upon execution of the instructions by a processor 316A of the server 300, the server 300 is caused to execute a method or procedure according to any one of the embodiments described herein in conjunction with FIG. 3. The data disc 700 is arranged to be connected to or within and read by a reading device (not shown), for loading the instructions into the processor. One such example of a reading device in combination with one (or several) data disc(s) 700 is a hard drive. It should be noted that the computer-readable medium can also be other mediums such as compact discs, flash memories or other memory technologies commonly used. In such embodiments the data disc 700 is one type of a tangible computer-readable medium. The instructions may alternatively be downloaded to a computer data reading device, such as a server 300 capable of reading computer coded data on a computer-readable medium, by comprising the instructions in a computer-readable signal (not shown) which is transmitted via a wireless (or wired) interface (for example via the Internet) to the computer data reading device for loading the instructions into a processor 316A of the server 300. In such embodiments, the computer-readable signal is one type of a non-tangible computer-readable medium.

Figure 8:
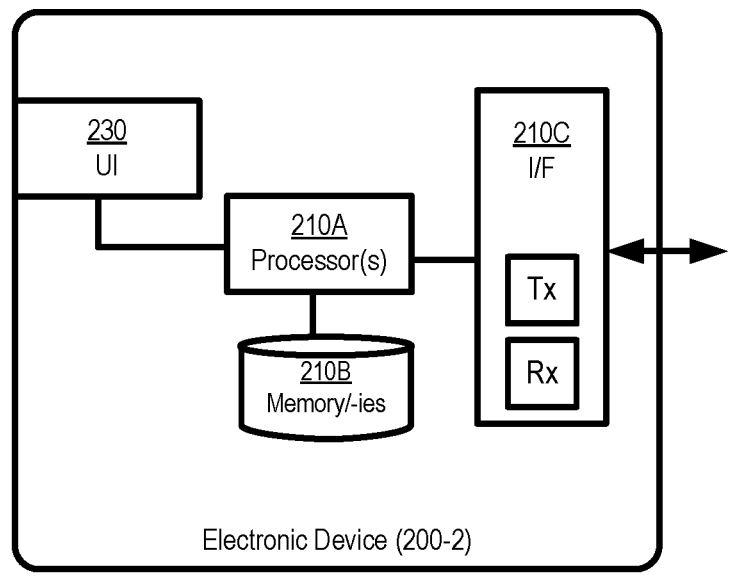
FIG. 8 shows an example implementation of an electronic device in accordance with some embodiments.

Reference is now made to FIG. 8, which schematically illustrates an example implementation of a second electronic device 200-2 (see FIGS. 1 and 2) in accordance with some embodiments. The second electronic device 200-2 is configured to perform, or otherwise execute, the method 2000 in accordance with FIG. 5. To this end, the second electronic device 200-2 comprises a user interface 230. The second electronic device 200-2 also comprises hardware resources 210 (see also FIG. 2). For example, the second electronic device 200-2 may comprise one or more processors 210A and one or more memories 210B. Also, a communications interface 210C, or a communications circuitry, may be provided in order to allow the second electronic device 200-2 to communicate with electronic devices 200-1 and/or servers 300 and/or media presentation systems 500, e.g. via a network 400 such as the Internet (see FIG. 1). To this end, the communications interface 210C may comprise a transmitter (Tx) and a receiver (Rx). Alternatively, the communications interface 210C may comprise a transceiver (Tx/Rx) combining both transmission and reception capabilities. The communications interface 210C may include a radio frequency (RF) interface allowing the second electronic device 200-2 to communicate with electronic devices 200-1 and/or servers 300 and/or media presentation systems 500 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera. As can be seen in FIG. 2, the second electronic device 200-2 may also comprise one or more applications, e.g. the media playback software application 220. The applications are sets of instructions (e.g., computer program code), stored in memory 210B, that when executed by the one or more processors 210A control the operation of the second electronic device 200-2 (e.g., cause the method 2000 to be performed).

In some implementations, the one or more memories 210B store computer program code, which, when run in the one or more processors 210A causes the second electronic device 200-2 to receive a request to explore whether a first electronic device is located within a defined geographic proximity from the second electronic device; in response to a determination that a first electronic device is located within a defined geographic proximity from the second electronic device, access relative distance information indicating the relative distance between the second electronic device and the first electronic device; in response thereto operate on the accessed relative distance information to generate a visual map at a user interface of the second electronic device, wherein the second electronic device and the first electronic devices are plotted as icons within the visual map to present the relative distance between the second electronic device and the first electronic device on the visual map; and in response to receiving a request to access a playlist associated with a plotted icon representing the first electronic device, access the playlist associated with the first electronic device by presenting the playlist at the user interface.

The one or more memories 210B may further comprise instructions executable by the one or more processors 210A whereby the second electronic device 200-2 is operative to receive the request to explore whether the first electronic device is located in a defined geographic proximity from the second electronic device by detecting a first control gesture at the user interface 230. The first control gesture may for instance be a tap gesture, a swipe gesture, or a hovering gesture.

In some embodiments, the one or more memories 210B may comprise instructions executable by the one or more processors 210A whereby the second electronic device 200-2 is operative to receive the request to access the playlist associated with the plotted icon representing first electronic device by detecting a second control gesture at the user interface. The second control gesture may for instance be a tap gesture, a swipe gesture, or a hovering gesture at the plotted icon representing first electronic device.

In some embodiments, the one or more memories 210B may comprise instructions executable by the one or more processors 210A whereby the second electronic device 200-2 is operative to receive a request to manipulate an order of media items of the presented playlist in accordance with a user preference; and in response thereto transmit, by the transmitter (Tx) 210C, a request to a server 300 requesting the server to manipulate the order of media items in the playlist in accordance with the user preference.

In some embodiments, the one or more memories 210B may comprise instructions executable by the one or more processors 210A whereby the second electronic device 200-2 is operative transmit, through the transmitter (Tx) 210C to a server 300, second geographic information that indicates a geographic location of the second electronic device 200-2; and receive, through the receiver (Rx) 210C from the server 300, relative distance information indicating the relative distance between the second electronic device 200-2 and the first electronic device 200-1 in response to a determination by the server 300 that the first electronic device 200-1 is located in a defined geographic proximity from the second electronic device 200-2.

Figure 9:
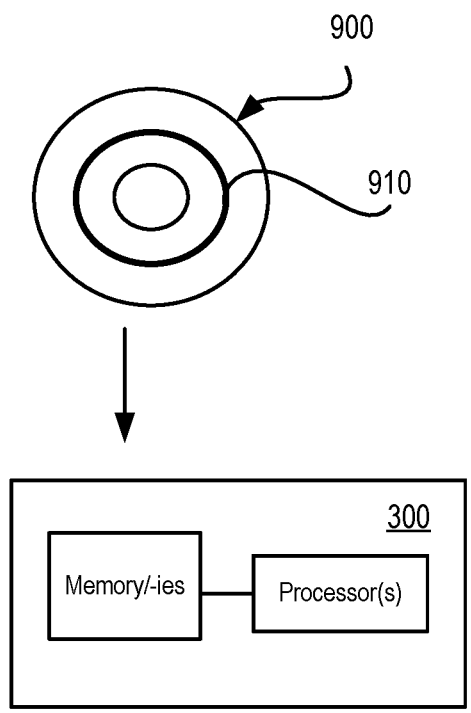
FIG. 9 illustrates a carrier comprising a computer program, in accordance with some embodiments.

FIG. 9 shows an example of a non-transitory computer-readable medium, in this example in the form of a data disc 900. In some embodiments the data disc 900 is a magnetic data storage disc. The data disc 900 is configured to carry instructions 910 that can be loaded into a memory 210B of an electronic device 200 (e.g. the second electronic device 200-2). Upon execution of the instructions by a processor 210A of the electronic device 200, the electronic device 200 is caused to execute a method or procedure according to any one of the embodiments described herein in conjunction with FIG. 5. The data disc 900 is arranged to be connected to or within and read by a reading device (not shown), for loading the instructions into the processor. One such example of a reading device in combination with one (or several) data disc(s) 900 is a hard drive. It should be noted that the computer-readable medium can also be other mediums such as compact discs, flash memories or other memory technologies commonly used. In such embodiments the data disc 900 is one type of a tangible computer-readable medium. The instructions may alternatively be downloaded to a computer data reading device, such as an electronic device 200 capable of reading computer coded data on a computer-readable medium, by comprising the instructions in a computer-readable signal (not shown) which is transmitted via a wireless (or wired) interface (for example via the Internet) to the computer data reading device for loading the instructions into a processor 210A of the electronic device 200. In such embodiments, the computer-readable signal is one type of a non-tangible computer-readable medium.

Various embodiments described throughout this disclosure may enable a user of an electronic device to control a queue of playable media items (e.g., songs) in a playlist, which is associated with a different electronic device. The authorization to control the playlist associated with this other electronic device is determined based on the proximity between the electronic device and this other electronic device. Embodiments described herein therefore enable users of electronic devices to control each other's playlists when the users (and their respective electronic devices) are proximate to one another. In an example scenario at a social gathering, e.g. a party, several users (and their respective electronic devices) may be proximate to each other and all users (and their respective electronic devices) that are located within a defined geographic proximity to the first electronic device may be authorized to control the playlist associated with the first electronic device. In this way, several users may be invited to collaboratively control a queue of playable media items to be played at the social gathering. This, in turn, may lead to improved user experiences at social gatherings. For example, the embodiments herein allow users to seamlessly live-queue (and/or mix) media items into a common playlist of media items to be played at the social gathering.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. For example, while certain gestures (e.g., hovering gestures, press gestures, and tap gestures) have been described to exemplify some embodiments, other conceivable gestures also exist (e.g. flick gestures, swipe gestures, swipe-and-hold gestures, release-of-hold gestures) that could be contemplated when reducing embodiments described herein into practice. Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/ comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

What is claimed is:

1. A method of controlling manipulation of a playlist including a queue of media items to be played, the method being performed by a server having one or more processors and a memory storing instructions for execution by the one or more processors, the method comprising:

authorizing a first electronic device, associated with a first user account, to control the manipulation of the playlist;

generating the playlist based on a set of media preferences associated with the first electronic device;

after authorizing a second electronic device, associated with a second user account distinct from the first user account, to manipulate the playlist:

receiving, from the second electronic device a request to update an order of media items in the playlist; and generating an updated order of media items in the playlist in response to receiving the request from the second electronic device.

2. The method of claim 1, further comprising, authorizing the second electronic device to manipulate the playlist in accordance with a determination that the first and the second electronic devices are located within a defined geographic proximity.

3. The method of claim 2, further comprising, at the server, determining that the first electronic device and the second electronic device are located within the defined geographic proximity, including receiving, from the first electronic device, a geographic location of the first electronic device and receiving, from the second electronic device, a geographic location of the second electronic device.

4. The method of claim 2, further comprising, at the server, determining that the first electronic device and the second electronic device are located within the defined geographic proximity, including receiving, from the second electronic device, a message indicating that the second electronic device is within the defined geographic proximity with the first electronic device.

5. The method of claim 1, further comprising:

accessing third geographic information that indicates a geographic location of a third electronic device; and in response to a determination that the third electronic device has entered a defined geographic proximity with the first electronic device, authorizing the third electronic device to manipulate the playlist.

6. The method of claim 5, further comprising:

generating updated orders of media items in the playlist in response to receiving respective requests from the first electronic device, the second electronic device, and the third electronic device to manipulate the playlist.

7. A server for controlling manipulation of a playlist including a queue of media items to be played, the server comprising:

one or more processors; and a memory storing instructions executable by the one or more processors to cause the server to:

authorize a first electronic device, associated with a first user account, to control the manipulation of the playlist;

generate the playlist based on a set of media preferences associated with the first electronic device;

after authorizing a second electronic device, associated with a second user account distinct from the first user account, to manipulate the playlist:

receive, from the second electronic device, a request to update an order of media items in the playlist; and generate an updated order of media items in the playlist in response to receiving the request from the second electronic device.

8. The server of claim 7, wherein the memory further stores instructions executable by the one or more processors to cause the server to authorize the second electronic device to manipulate the playlist in accordance with a determination that the first and the second electronic devices are located within a defined geographic proximity.

9. The server of claim 8, wherein the memory further stores instructions executable by the one or more processors to cause the server to determine that the first and the second electronic devices are located within the defined geographic proximity, including receiving, from the first electronic device, a geographic location of the first electronic device and receiving, from the second electronic device, a geographic location of the second electronic device.

10. The server of claim 8, wherein the memory further stores instructions executable by the one or more processors to cause the server to determine that the first and the second electronic devices are located within the defined geographic proximity, including receiving, from the second electronic device, a message indicating that the second electronic device is within the defined geographic proximity with the first electronic device.

11. The server of claim 7, wherein the memory further stores instructions executable by the one or more processors to cause the server to:

access third geographic information that indicates a geographic location of a third electronic device; and in response to a determination that a third electronic device has entered a defined geographic proximity with the first electronic device, authorize the third electronic device to manipulate the playlist.

12. The server of claim 11, wherein the memory further stores instructions executable by the one or more processors to cause the server to:

generate updated orders of media items in the playlist in response to receiving respective requests from the first electronic device, the second electronic device, and the third electronic device to manipulate the playlist.

13. A non-transitory computer-readable storage medium storing instructions for controlling manipulation of a playlist that, when executed by a server, cause the server to:

authorize a first electronic device, associated with a first user account, to control the manipulation of the playlist;

generate the playlist based on a set of media preferences associated with the first electronic device;

after authorizing a second electronic device, associated with a second user account distinct from the first user account, to manipulate the playlist:

receive, from the second electronic device, a request to update an order of media items in the playlist; and generate an updated order of media items in the playlist in response to receiving the request from the second electronic device.

\* \* \* \* \*